US012030202B2

(12) United States Patent
Gratsias et al.

(10) Patent No.: US 12,030,202 B2
(45) Date of Patent: Jul. 9, 2024

(54) TRIPOD RAZOR HANDLE

(71) Applicant: Bic Violex S.A., Anoixi (GR)

(72) Inventors: Spiros Gratsias, Anoixi (GR); Maria Petratou, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 302 days.

(21) Appl. No.: 17/293,985

(22) PCT Filed: Nov. 29, 2019

(86) PCT No.: PCT/EP2019/083189
§ 371 (c)(1),
(2) Date: May 14, 2021

(87) PCT Pub. No.: WO2020/109609
PCT Pub. Date: Jun. 4, 2020

(65) Prior Publication Data

US 2022/0016795 A1 Jan. 20, 2022

(30) Foreign Application Priority Data

Nov. 29, 2018 (EP) .................................... 18209204

(51) Int. Cl.
*B26B 21/52* (2006.01)

(52) U.S. Cl.
CPC .......... *B26B 21/523* (2013.01); *B26B 21/522* (2013.01)

(58) Field of Classification Search
CPC ................ B26B 21/4062; B26B 21/52; B26B 21/521–523; B26B 21/525–528;
(Continued)

(56) References Cited

U.S. PATENT DOCUMENTS

| | | | | |
|---|---|---|---|---|
| 153,983 A * | 8/1874 | Rontey | F16M 11/00 | 248/688 |
| 286,699 A * | 10/1883 | Hornberger | F16M 11/00 | 248/688 |

(Continued)

FOREIGN PATENT DOCUMENTS

| | | | | |
|---|---|---|---|---|
| CN | 213146045 U * | 5/2021 | F16M 11/34 |
| DE | 29613102 U1 | 10/1996 | |

(Continued)

OTHER PUBLICATIONS

International Search Report and Written Opinion in International Application No. PCT/EP2019/083189, dated Feb. 20, 2020 (13 pages).

(Continued)

*Primary Examiner* — Jason Daniel Prone
(74) *Attorney, Agent, or Firm* — Bookoff McAndrews, PLLC

(57) ABSTRACT

A razor handle includes a top portion to connect to a blade assembly; a bottom portion to support the top portion, and more than one supporting member, a respective proximal end of each supporting member being operatively connected to the top portion and the supporting members extending distally therefrom, wherein the supporting members are provided to adopt a first configuration and a second configuration, and wherein when at least one supporting member is in the second configuration, the razor handle has a broader footprint than when all of the supporting members are in the first configuration.

17 Claims, 5 Drawing Sheets

(58) Field of Classification Search
CPC .......... F16M 13/005; B25G 1/04; B25G 1/06; B25G 1/08
USPC .................. 30/47–51, 526–536; D28/46–48
See application file for complete search history.

(56) References Cited

U.S. PATENT DOCUMENTS

| | | | | | |
|---|---|---|---|---|---|
| 1,870,924 | A * | 8/1932 | Platzer | B43K 23/04 | 248/688 |
| 1,966,307 | A | 7/1934 | Ohmer | | |
| 2,320,374 | A | 6/1943 | Georges | | |
| D140,654 | S * | 3/1945 | Cotton | D28/46 | |
| 3,111,757 | A | 11/1963 | Bubofsky | | |
| 3,881,675 | A * | 5/1975 | Matchett | F16M 11/242 | 248/170 |
| 3,921,947 | A * | 11/1975 | Adam | F16M 11/16 | 248/168 |
| 4,208,703 | A * | 6/1980 | Orr | F16M 11/38 | 362/322 |
| 4,317,552 | A * | 3/1982 | Weidler | F16M 13/00 | 248/168 |
| 4,438,896 | A * | 3/1984 | Hall | F16M 11/16 | 248/168 |
| 4,638,560 | A * | 1/1987 | Higashi | B26B 21/523 | 30/47 |
| D299,244 | S * | 1/1989 | Jones | D16/244 | |
| D301,402 | S * | 6/1989 | Hirsch | A45D 42/16 | D4/108 |
| 4,925,137 | A * | 5/1990 | Hastings | F16M 11/242 | 126/30 |
| D310,580 | S * | 9/1990 | King | D28/46 | |
| 5,187,829 | A * | 2/1993 | Atkins | A46B 15/0097 | D4/107 |
| 5,353,464 | A * | 10/1994 | Atkins | A46B 15/0097 | D4/107 |
| 5,384,609 | A * | 1/1995 | Ogawa | F16M 11/10 | 396/419 |
| 5,590,436 | A * | 1/1997 | Wright | A46B 15/0097 | 446/73 |
| 5,746,406 | A * | 5/1998 | Dicke | F16M 11/16 | 248/513 |
| 5,839,198 | A | 11/1998 | McCoy | | |
| D408,997 | S * | 5/1999 | Holland | D4/108 | |
| 6,076,223 | A * | 6/2000 | Dair | A46B 15/0097 | 248/688 |
| 6,094,768 | A * | 8/2000 | Hugon | A46B 5/0062 | D4/104 |
| 6,109,573 | A * | 8/2000 | Liao | F16M 11/10 | 403/92 |
| 6,170,113 | B1 * | 1/2001 | Cornu | A46B 5/00 | 248/688 |
| 6,189,845 | B1 * | 2/2001 | Chen | F16M 13/00 | 248/292.12 |
| 6,305,653 | B1 * | 10/2001 | Oldham | F16M 11/34 | 248/463 |
| 6,698,065 | B2 * | 3/2004 | Lauer | A46B 15/0097 | 401/268 |
| 6,907,638 | B2 * | 6/2005 | Katz | A46B 5/00 | 248/688 |
| 7,389,781 | B2 * | 6/2008 | Kemp | A46B 15/0097 | 132/308 |
| D603,096 | S * | 10/2009 | Greene | D28/46 | |
| D605,362 | S * | 12/2009 | Andersen | D28/48 | |
| 7,917,986 | B2 * | 4/2011 | Jimenez | A46B 15/0097 | 15/22.1 |
| 8,869,442 | B2 * | 10/2014 | Moody | F16M 13/06 | 42/72 |
| D718,365 | S * | 11/2014 | Kim | D16/244 | |
| D739,456 | S * | 9/2015 | Poli | D16/244 | |
| 9,308,658 | B2 * | 4/2016 | Coviello | B26B 21/4062 | |
| D776,876 | S * | 1/2017 | Coviello | D28/48 | |
| D783,900 | S * | 4/2017 | Coviello | D28/48 | |
| 9,713,879 | B2 * | 7/2017 | Samuels | B26B 21/523 | |
| 9,999,293 | B2 * | 6/2018 | Weber | B25G 1/04 | |
| 11,813,762 | B2 * | 11/2023 | Petratou | B26B 21/523 | |
| 2008/0110025 | A1 * | 5/2008 | Bucalo | B26B 21/52 | 30/526 |
| 2012/0192429 | A1 | 8/2012 | Savarese | | |
| 2013/0026315 | A1 * | 1/2013 | Lee | F16M 11/16 | 248/168 |
| 2016/0046029 | A1 | 2/2016 | Samuels et al. | | |
| 2016/0368157 | A1 | 12/2016 | Giannelli et al. | | |
| 2017/0036361 | A1 | 2/2017 | Bushell | | |
| 2017/0192344 | A1 * | 7/2017 | Chi | F16M 11/16 | |
| 2017/0303674 | A1 * | 10/2017 | Nguyen | A46B 15/0097 | |
| 2021/0187766 | A1 * | 6/2021 | Petratou | B26B 21/4062 | |
| 2021/0317942 | A1 * | 10/2021 | Mendo | F16M 11/16 | |
| 2023/0020970 | A1 * | 1/2023 | Zahariev | F16M 11/16 | |

FOREIGN PATENT DOCUMENTS

| | | | | |
|---|---|---|---|---|
| GB | 138689 | A * | 2/1920 | F16M 13/00 |
| GB | 628855 | A | 9/1949 | |
| JP | 2003057741 | A * | 2/2003 | F16M 11/32 |
| WO | WO-2010148634 | A1 * | 12/2010 | F16M 11/32 |

OTHER PUBLICATIONS

"How to: Make a Mini DIY Camera Tripod Using Old Disposable Razors", by Osas Obaiza, Jan. 2, 2013, retrieved on May 13, 2021 from <https://digital-photography.wonderhowto.com/how-to/make-mini-diy-camera-tripod-using-old-disposable-razors-0140393/> (4 pages).

* cited by examiner

TRIPOD RAZOR HANDLE

CROSS-REFERENCE TO RELATED APPLICATION(S)

This application is a National Stage Application of International Application No. PCT/EP2019/083189, filed on Nov. 29, 2019, now published as WO/2020/109609 and which claims priority to European Patent Application No. EP18209204.9, filed on Nov. 29, 2018, entitled "TRIPOD RAZOR HANDLE", the entire contents of which are incorporated herein by reference.

The present disclosure relates to a razor, and more specifically, to a deployable razor handle comprising more than one supporting member that is adapted to hold the razor handle in an upright configuration. Additionally, a razor may include the deployable razor handle and blade assembly including at least one blade. The blade assembly may be fixed or detachable from the razor handle. The blade assembly may be interchangeable, in particular, when a blade or blades of the blade assembly have been blunted. The razor may be specifically adapted for shaving facial, head, and/or body hair.

BACKGROUND

Two common problems with shaving blade assemblies are storage of the razor and keeping a high level of hygiene. For example, shaving blade assemblies that require a tray or a holder are common, however the trays or holders may be difficult to store due to their bulky size and usually do not provide a means for draining fluid that may be collected in the tray and thus can leave the razor blades in a pool of fluid due to the orientation of the razor within the tray.

To address these issues, shaving blade assemblies comprising a mechanism to orient and hold the razor upright have been developed. For example, U.S. Pat. No. 5,839,198 A discloses a razor having integral means for holding the razor. The integral holding means allow the user of the razor to conveniently place the razor on a surface for temporary storage during shaving.

Another example is U.S. Pat. No. 3,111,757 A which discloses an attachment which is adaptable for use with various makes of safety razors and which may be adjusted relative to the longitudinal axis of the handle of the safety razor to a proper position, to afford the proper balance of the razor when held in a normal position by the hand.

Another example is US 2017/0036361 A1 which discloses a razor handle that provides maximum control when shaving is disclosed. The handle base may have a rectangular prism or tetrahedral frustum shape, with one unique side surface for each of a user's three fingertips. The base naturally stands upright when not in use, thereby keeping the blade from making direct contact with wet surfaces for extended periods of time.

Another example is U.S. Pat. No. 1,966,307 A which discloses a head, preferably curved, having a spindle thereon, a handle composed of two members functioning as a hand hold when the razor is in use, and capable also of being adjusted to a position where they contact with the outer ends of the head, to reduce the razor dimensions in one direction to facilitate the razor being packed in a small compass; and a clamping sleeve threaded on the spindle, the handle members being mounted on such sleeve.

Another example is GB628855 A which discloses a hollow handle having a grip being slit in appropriate proportions, the ends at the base being free, a metal band is placed over the slits keeping them in position. When the metal band is moved up the handle, it varies the flexibility as required, and also allows the slits to expand thus allowing the razor to stand upright on the base of the handle requiring less room on shelf or wash basin.

SUMMARY

To address the problems of storing a razor easily and, at the same time, keeping a high level of hygiene, a razor handle according to claim 1 is provided.

In particular, a razor handle comprising a top portion configured to connect to a blade assembly; and a bottom portion configured to support the top portion. The bottom portion comprising more than one supporting member, a respective proximal end of each supporting member being operatively connected to the top portion and the supporting members extending distally therefrom. The supporting members are configured to adopt a first configuration and a second configuration, and when at least one supporting member is in the second configuration, the razor handle has a broader footprint than when all of the supporting members are in the first configuration.

According to some embodiments, the razor handle may further include a connection member configured to engage engagement elements of the supporting members, wherein the connection member may further include a stop configured to limit rotational movement of the supporting members.

According to some embodiments, the supporting members may be formed as struts, which in the first configuration form the gripping portion of the razor handle.

According to some embodiments, the respective proximal ends of the supporting members may include at least one engagement element.

According to some embodiments, the top portion may include a connection member configured to engage the engagement elements of the supporting members.

According to some embodiments, the engagement elements of the supporting members and the connection member may be hingedly attached.

According to some embodiments, each of the supporting members may include a respective pivoting axis. A first supporting member may be configured to pivots about a pivot axis different from a second supporting member.

According to some embodiments, one of the engagement elements or the connection member may be protrusions and the other of the engagement elements and connection member may be recesses.

According to some embodiments, the stop may limit the rotation of the one or more supporting members in an angle of less than 60 degrees, defined by the supporting member axis and the handle longitudinal axis.

According to some embodiments, the stop may limit the rotation of the one or more supporting members in an angle in the range of 25 to 50 degrees, defined by the supporting member axis and the handle longitudinal axis.

According to some embodiments, the connection member may further include a stop configured to restrict the rotational movement of the supporting members.

According to some embodiments, the stop may be formed with a rounded surface that may be configured to permit rotational movement of the supporting members.

According to some embodiments, the proximal end of one or more supporting members may include a relief that is configured to permit rotational movement of the supporting member.

According to some embodiments, the footprint in the deployed configuration is at least two times larger than the footprint in the first configuration.

According to some embodiments, a method of configuring a razor handle to be stored in an upright configuration is disclosed. The method comprises providing the aforementioned razor handle; and moving at least one supporting member of the razor handle into the second configuration.

According to some embodiments, a razor assembly is disclosed. The razor assembly comprises a blade assembly and the aforementioned razor handle.

This configuration of a standing razor allows the razor handle or razor to be easily stored on a surface (e.g., countertop), for example, to fully dry after a wet shave. Additionally, this configuration allows the razor handle to have a small footprint, so it can be stored on a surface with limited available space. When a user is finished with the shaving and desires to store it in a confined space, such as a medicine cabinet or a toiletry bag, the razor or razor handle can be manipulated into the first configuration. This easily transformative configuration renders use of a tray optional or even obsolete.

The above summary is not intended to describe each and every implementation of the concept. In particular, selected features of any illustrative embodiment within this disclosure may be incorporated into additional embodiments unless clearly stated to the contrary.

BRIEF DESCRIPTION OF THE DRAWINGS

The disclosure may be more completely understood in consideration of the following detailed description of examples of the disclosure in connection with the accompanying drawings, in which.

Figure 1:
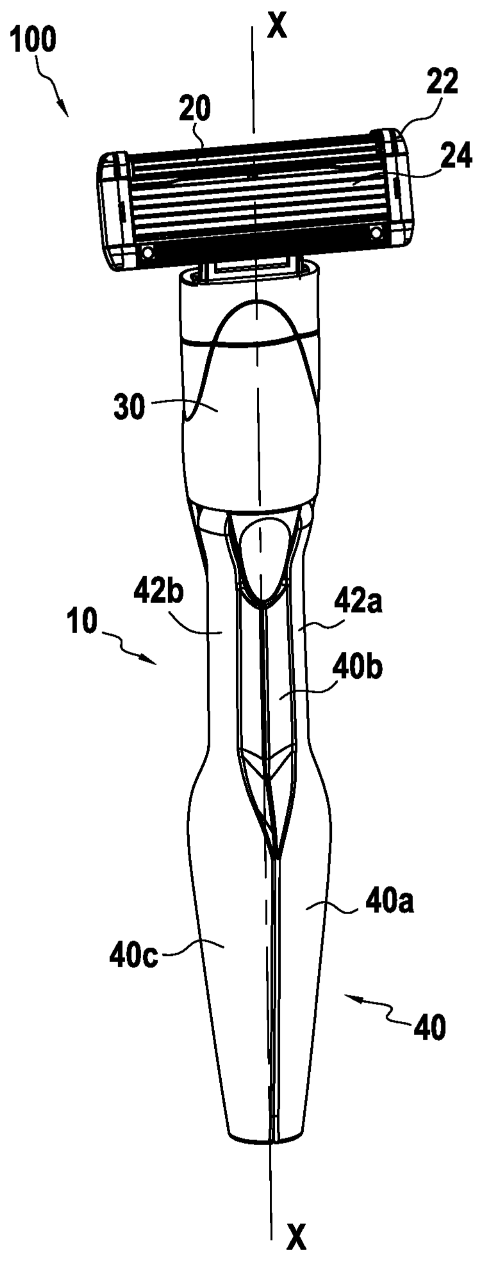
FIG. 1 is a perspective front view of a razor according to a first example when the supporting members are in a first configuration.

While examples of the disclosure are amenable to various modifications and alternative forms, specifics thereof have been shown by way of example in the drawings and will be described in detail. It should be understood, however, that the intention is not to limit examples of the disclosure to the particular embodiments described. On the contrary, the intention of this disclosure is to cover all modifications, equivalents, and alternatives falling within the scope of the disclosure.

DETAILED DESCRIPTION

As used in this disclosure and the appended claims, the singular forms "a", "an", and "the" include plural referents unless the content clearly dictates otherwise. As used in this disclosure and the appended claims, the term "or" is generally employed in its sense including "and/or" unless the content clearly dictates otherwise.

The following detailed description should be read with reference to the drawings. The detailed description and the drawings, which are not necessarily to scale, depict illustrative examples and are not intended to limit the scope of the present disclosure. The illustrative examples depicted are intended only as exemplary.

FIG. 1 shows a perspective view of the front of a razor 100 having a blade assembly 20 and a razor handle 10. FIG. 1 shows the razor handle 10 in a closed, first configuration. The razor handle has a top portion 30 and a bottom portion 40. The bottom portion 40 may be connected to the top portion 30 and extend distally therefrom. The bottom portion comprises more than one supporting member 40*a*-40*c*. The razor handle 10 may be shaped to better adapt to the natural contours of a hand when in the closed, first configuration. Additionally, the razor handle may further comprise grips 42*a*-42*c*, made of the same or a different material (e.g. rubber) thus improving the handling. The blade assembly 20 may have a housing 22 that may be hollow and generally form a rectangular parallelepiped; however, the housing 22 may be of any other suitable shape.

Secured within the housing 22 is at least one blade 24. In this embodiment, a plurality of blades 24 are shown, however, it is contemplated that the blade assembly may have any number of blades 24. Additionally, the blades 24 that are shown are elongate in shape; however, it is contemplated that the blades 24 may be formed into any other suitable shape. Additionally, each blade may be one piece, bent to form an angle, or may comprise a blade support attached on it.

Figure 2B:
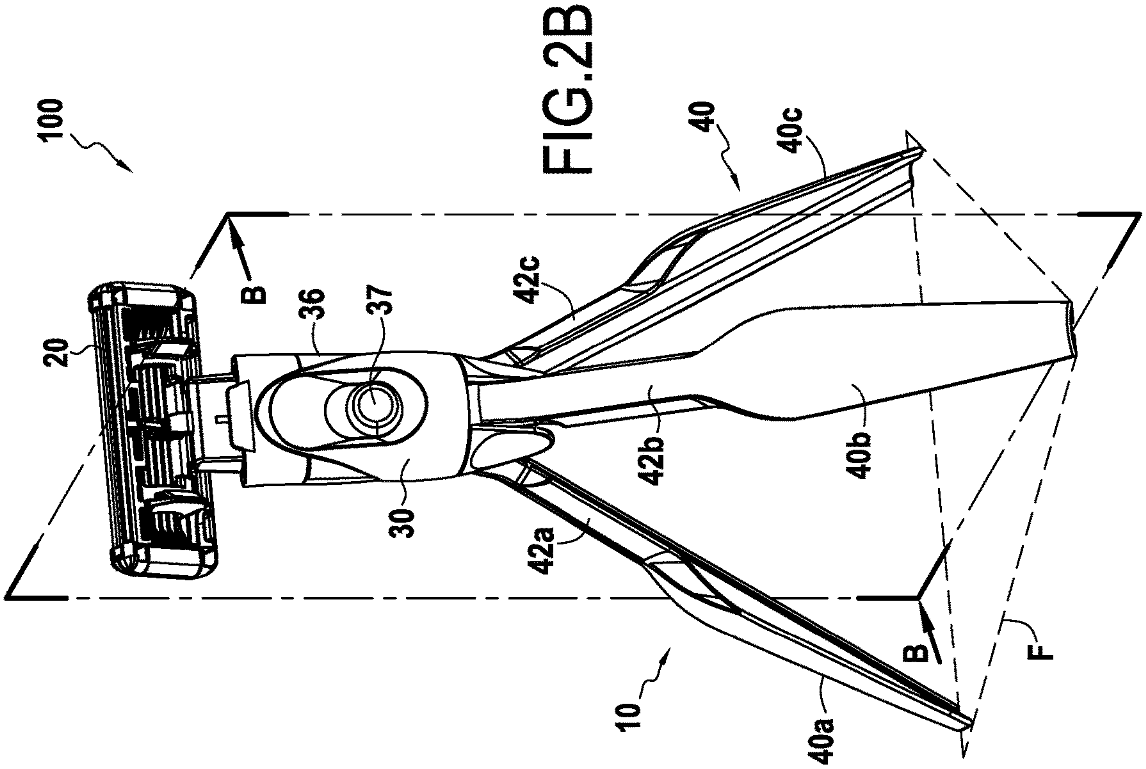
FIG. 2B is a perspective back view of the razor of FIG. 2A when the supporting members are in a second configuration.
Figure 2A:
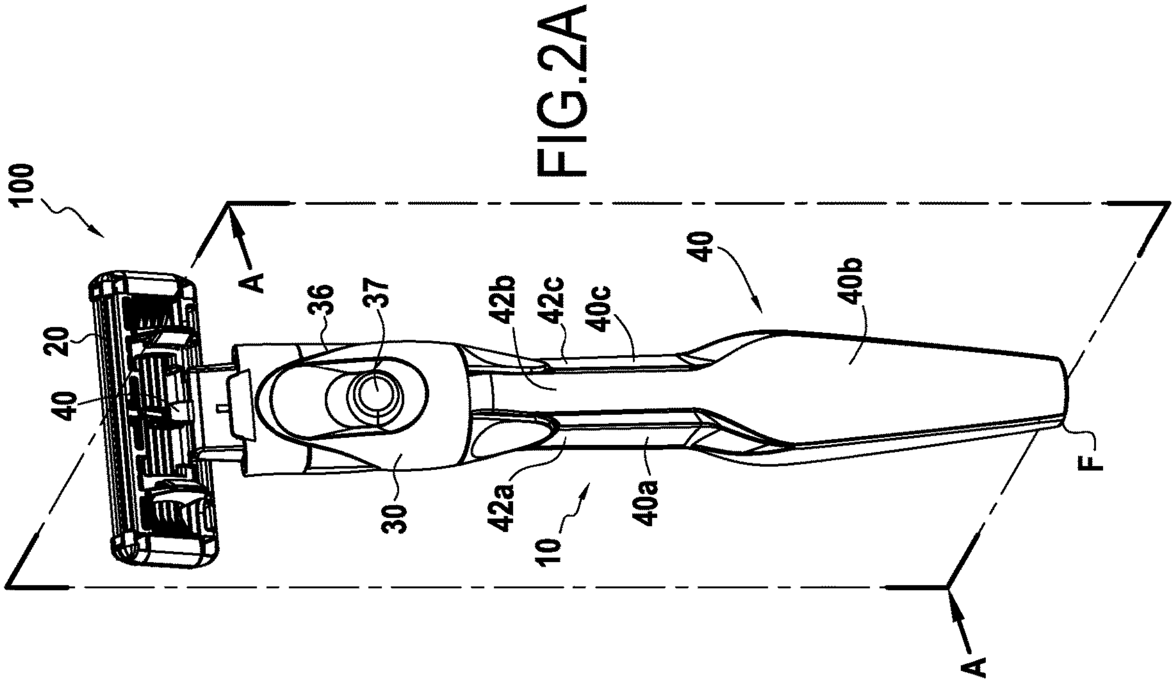
FIG. 2A is a perspective back view of the razor of FIG. 1.

FIG. 2A, shows the back of the razor 10 in the closed, first configuration. FIG. 2B shows the back of the razor 10 in the second, deployed configuration. The bottom portion 40 of the razor handle 10 comprises more than one supporting member 40*a*-40*c*. Each of the supporting members 40*a*-40*c* is operatively connected to the top portion 30. In the deployed configuration, the supporting members 40*a*-40*c* are moved away from each other thereby providing a wider footprint F than when in the first configuration.

The footprint F may be an area defined by the distal most ends of the supporting members 40*a*-40*c*. For example, the footprint F of the razor 10 in the deployed, second configuration may be larger than the footprint F of the razor 100 in the first, closed configuration. In examples, the footprint in the second (deployed) configuration may be at least two times larger than the footprint of the razor in the first (closed) configuration. In alternatives, only one supporting member may be deployed, i.e. adopting the second configuration. In these cases, the footprint in the second (deployed) configuration may also be larger than the footprint with all supporting members in the first (closed) configuration. In the deployed configuration, the top portion 30 of the razor handle 10 or the razor 100, when the blade assembly 20 is attached to the razor handle 10, can be supported by the supporting members 40*a*-40*c* in an upright configuration.

Figure 3:
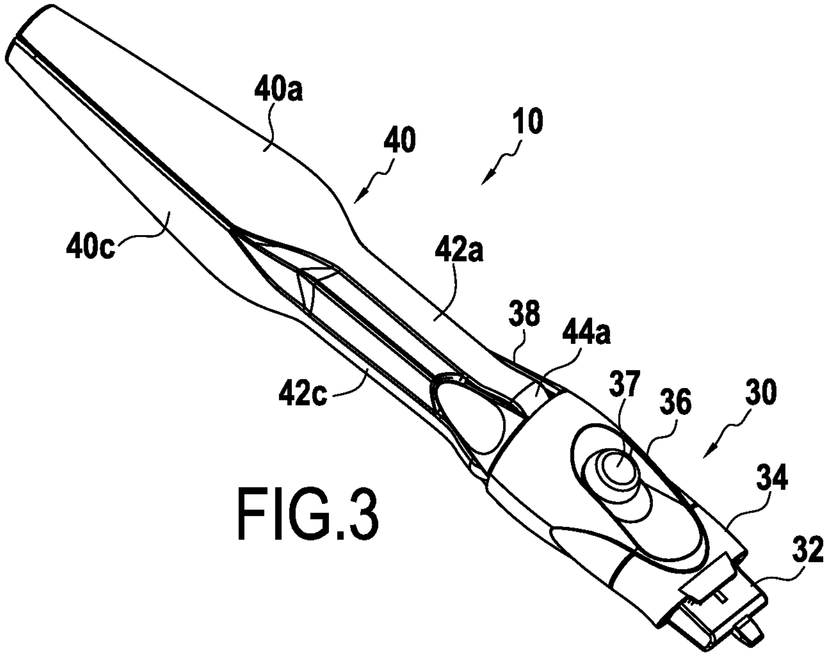
FIG. 3 is a perspective view of a razor handle according to the first example when the supporting members are in the first configuration.
Figure 4:
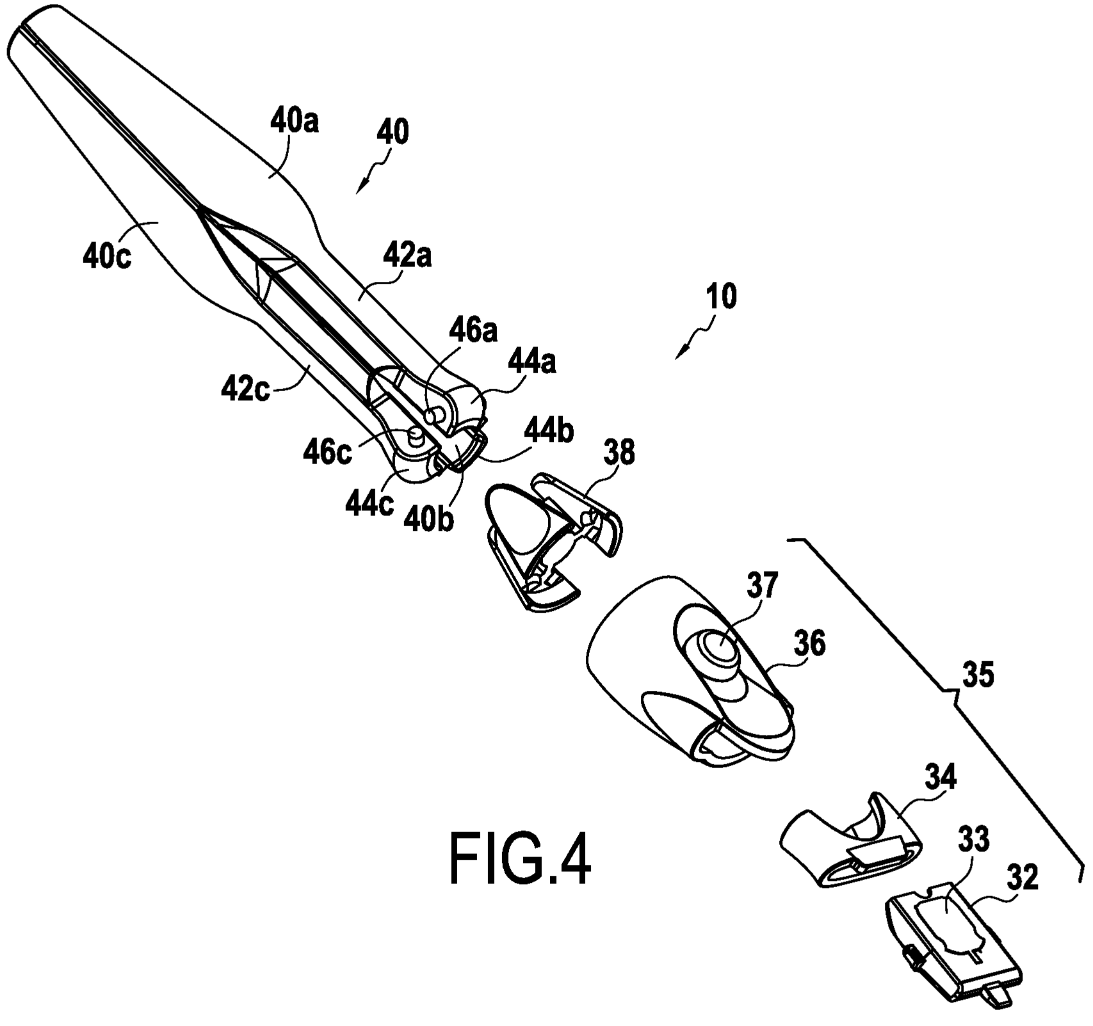
FIG. 4 is an exploded view of a razor handle of FIG. 3.

As shown in the examples of FIGS. 3 and 4, the top portion 30 of the razor handle 10 may include a blade assembly attachment mechanism 35 including a button 37.

The top portion 30 may also include a collar 34 that connects the cartridge connecting structure 32 to the button guard 36. The button guard 36 may include the button 37 which may be configured to deform so as to allow a user to engage an ejector 33 of the cartridge connecting structure 32 in order to control the attachment and detachment of the blade assembly 20.

The button 37 may have a water tight seal with the button guard 36 to prevent debris and sediment from entering the blade assembly attachment mechanism 35 and interfering with the operation of the blade assembly attachment mechanism 35.

A connection member 38 may be attached to the button guard 36. However, it is also contemplated that the connection member 38 may be monolithically formed with the button guard 36. It is further contemplated that the connection member 38 may be modular. The connection member 38 may be configured to connect with each of the supporting members 40*a*-40*c*. This connection may be a pin and hole, protrusion and relief, or any combination. In particular, a connection forming a hinge that allows each of the supporting members 40*a*-40*c* to pivot relative to the connection member 38 is envisioned.

Figure 5:
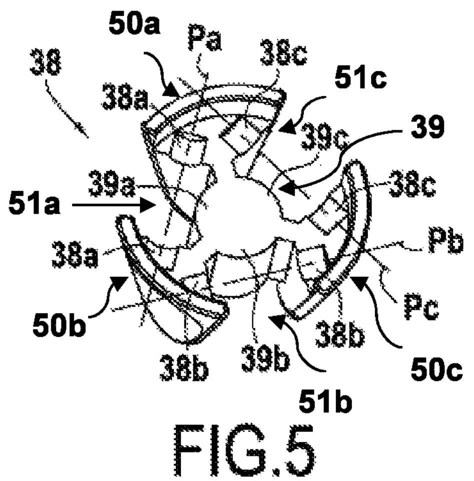
FIG. 5 is a perspective bottom view of the connecting member.
Figure 6:
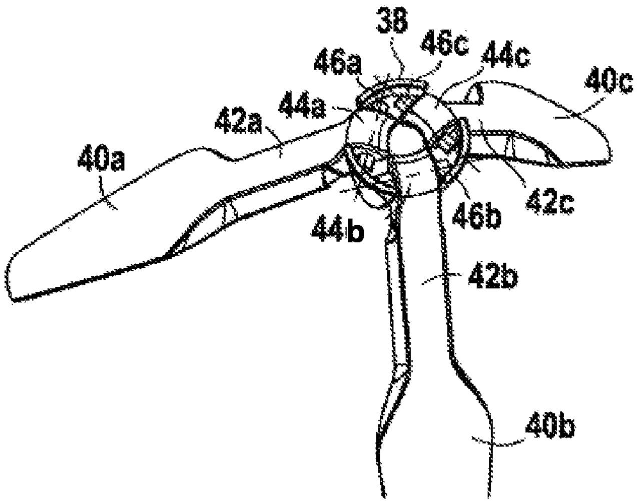
FIG. 6 is a perspective top view of the connecting member and the supporting members in a second configuration.

FIG. 5 shows a bottom view of the connection member 38 and FIG. 6 shows the supporting members 40*a*-40*c* positioned within the connecting member 38. In this example, each of the supporting members 40*a*-40*c* may include a pair of engagement elements 46*a*-46*c*. The engagement elements 46*a*-46*c* may be formed as pins. The connection member 38 may include a plurality of recesses 38*a*-38*c* that correspond with a pair of engagement elements 46*a*-46*c* of the supporting members 40*a*-40*c*. However, it is contemplated that the connection member 38 may have the engagement elements 46*a*-46*c* and the supporting members 40*a*-40*c* may have corresponding recesses. Further, although in this example, the engagement elements 46*a*-46*c* are formed as pins, any other suitable shape may be used, for example, protrusions.

With this configuration the supporting members 40*a*-40*c* are secured within the connection member 38 and adapted to pivot relative to the connection member 38, e.g., hingedly attached to the connection member 38. Each supporting member 40*a*-40*c* may have a pivot axis Pa, Pb, Pc. At least one supporting member 40*a*-40*c* may pivot about its respective pivot axis Pa, Pb, Pc which may be different from the pivot axis Pa, Pb, Pc of another supporting member 40*a*-40*c*. With this arrangement, the footprint F may become wider and the general balance of the razor when in an upright position is improved.

Shown in FIG. 5, the connection member 38 may include a stop 39, including stop portions 39*a*, 39*b*, and 39*c*. The stop 39 may limit the rotation of the one or more supporting member 40*a*-40*c*. In examples, the stop may limit rotation of one or more supporting members 40*a*-40*c* in an angle α of less than 60 degrees defined by the supporting member axis X' and the handle longitudinal axis X. In examples the angle α may be less or equal than 40 degrees. In another example the angle α may be between 10 and 35 degrees. When the angle α has the above mentioned values, the footprint F is small so it can be stored on a surface with limited available space and at the same time it serves for a secure standing in an upright position. The stop 39 may also be adapted to prevent over rotation of the supporting members 40*a*-40*c*. The stop 39 may have any appropriate shape to restrict the pivoting action of the supporting members 40*a*-40*c*, for example, a curved or cylindrical shape. The connection member 38 includes a first lobe 50*a*, a second lobe 50*b*, and a third lobe 50*c*, each of the lobes 50*a*-50*c* may extend outwardly from a central axis of the stop 39 to receive at least two engagement elements 46*a*-46*c*. Each of the lobes 50*a*-50*c* are separated from one another by a respective gap 51*a*-51*c*. For example, the first lobe 50*a* is separated from the second lobe 50*b* by a first gap 51*a*, the second lobe 50*b* is separated from the third lobe 50*c* by a second gap 51*b*, and the third lobe 50*c* is separated from the first lobe 50*a* by a third gap 51*c*. Each gap 51*a*-51*c* may receive a respective supporting member 40*a*-40*c* among the three supporting members. For example, the first gap 51*a* is configured to receive a first supporting member 40*a* among the three supporting members 40*a*-40*c*, the second gap 51*b* configured to receive a second supporting member 40*b* among the three supporting members 40*a*-40*c*, and the third gap 51*c* configured to receive a third supporting member 40*c* among the three supporting members 40*a*-40*c*. Each gap among the first gap 51*a*, the second gap 51*b*, and the third gap 51*c* extends along an entire length of the connection member 38 in parallel with the central axis of the connection member 38. Additionally, the proximal ends of the one or more supporting members 40*a*-40*c* may include a relief 44*a*-44*c*. The reliefs 44*a*-44*c* may be adapted to prevent over rotation of the supporting members 40*a*-40*c* by allowing the supporting members 40*a*-40*c* to not be encumbered by the stop 39 until the supporting members 40*a*-40*c* are in a predetermined position.

It is contemplated that the supporting members 40*a*-40*c* may have a high resistance (e.g., due to frictional forces) with the connection member 38 in order to avoid accidental pivoting of the supporting members 40*a*-40*c* during use. Accordingly, the user may need to apply a pivoting force to the supporting members 40*a*-40*c* in order place the razor 10 in the closed or deployed configuration. Further, the high resistance with the connection member 38 allows a user to place the razor 10 into a semi-deployed configuration. This semi-deployed configuration facilitates stability positioning the razor 10 without requiring full deployment of the supporting elements 40*a*-40*c*.

Figure 7B:
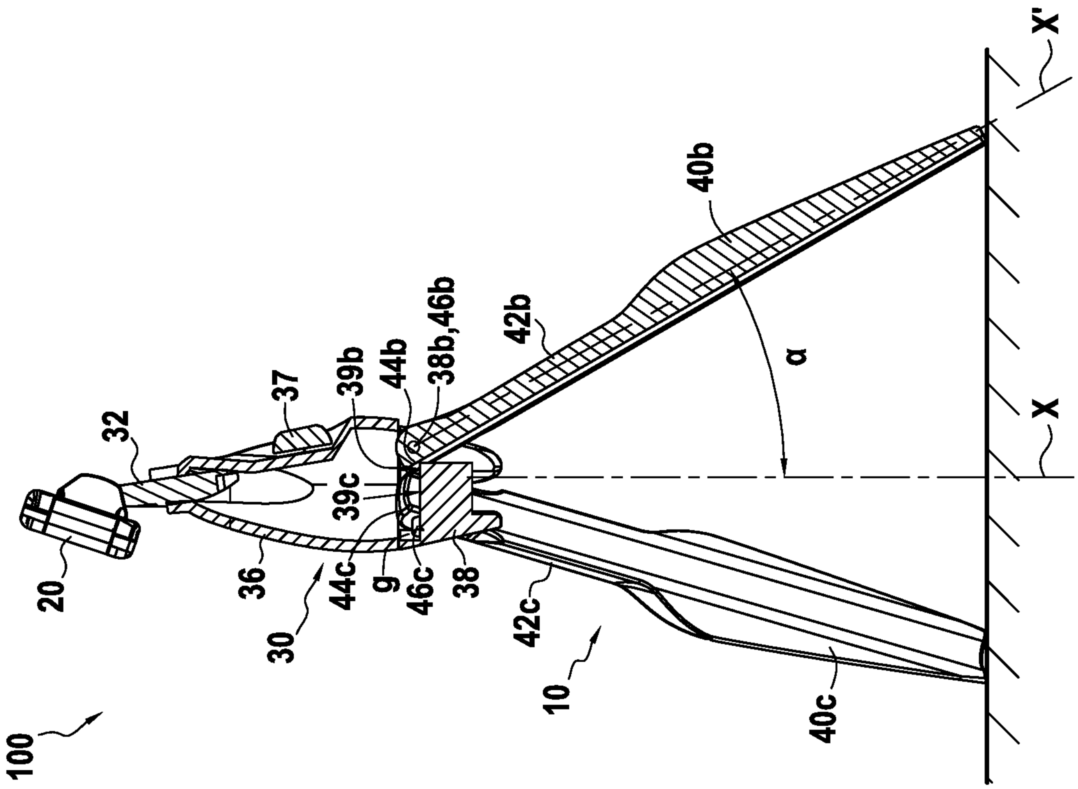
FIG. 7B is a cross-section of the razor of FIG. 2B along plane B-B.
Figure 7A:
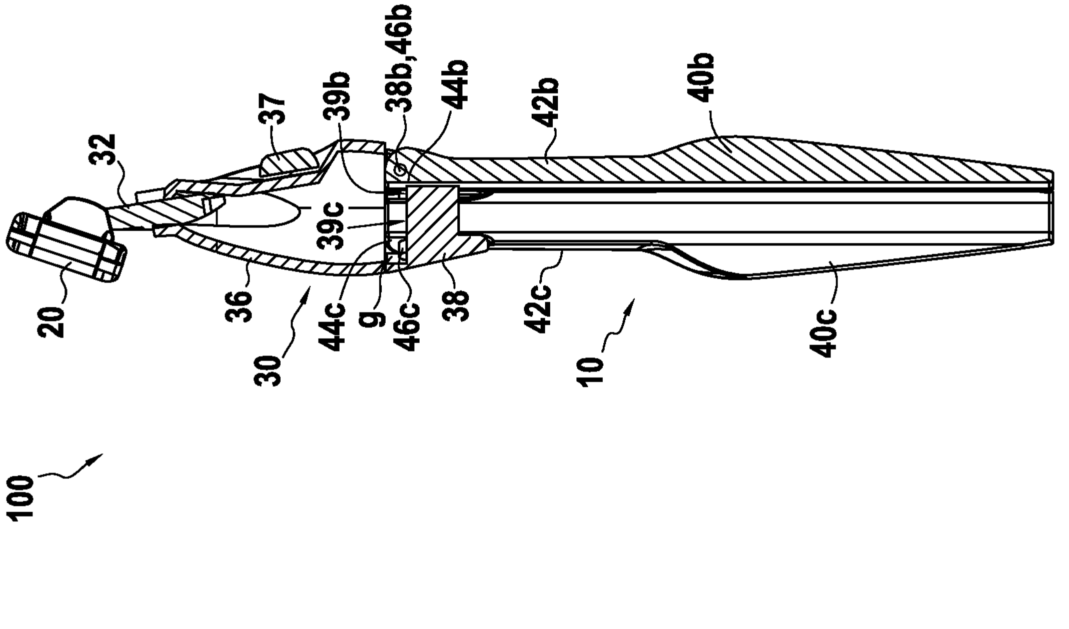
FIG. 7A is a cross-section of the razor of FIG. 2A along plane A-A.

FIG. 7A shows a cross section of the razor 100 of FIG. 2A along plane A-A. In this configuration, the supporting members 40*a*-40*c* are in the closed, first configuration. FIG. 7B shows a cross section of the razor 100 of FIG. 2B along plane B-B. In this configuration, the supporting members 40*a*-40*c* are in the deployed, second configuration.

Using supporting member 40*b* as an example, the relief 44*b* on the proximal end of the supporting member 40*b* is engaging the stop 39 of the connection member 38. Additionally, a portion of the proximal end of the supporting member 40*b* is positioned within a gap g formed between the connection member 38 and the button guard 36.

In operation, when a user desires to use the razor 100 or to store the razor 100 in a confined space, for example, a travel bag, the razor handle 100 can be manipulated into the closed first configuration. However, if a user desires to have the razor 100 be positioned into an unassisted upright configuration, the razor handle 10 can be manipulated into the deployed, second configuration.

This is beneficial because the razor may dry without use of a drying tray. Additionally, the razor can easily be converted between a compact storage/use configuration and an upright configuration. The upright configuration facilitates hygienic drying of the razor because the razor handle can be configured to position the razor blades away from a water or corrosive source while the blades are drying.

While it is disclosed that the user may open each of the supporting members 40*a*-40*c* individually, it is also contemplated that the razor 100 may be configured to allow the supporting members 40*a*-40*c* to move simultaneously, for example, implementing a center column and sliding ring that is attached to each of the supporting members 40$a$-40$c$ such that the supporting members 40-40$c$ can be moved in concert.

It is also contemplated that a spring device may be implemented such that the supporting members 40$a$-40$c$ may be automatically deployed upon activation.

Although the described embodiments were provided as different exemplary embodiments, it is envisioned that these embodiments are combinable or, when not conflicting, the features recited in the described embodiments may be interchangeable.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A razor handle comprising:

a top portion configured to connect to a blade assembly;

a connection member configured to connect to the top portion; and a bottom portion configured to support the connection member and comprising three supporting members, a respective proximal end of each supporting member of the three supporting members including engagement elements being rotationally connected to the connection member, wherein the three supporting members are configured to adopt a first configuration and a second configuration, wherein when at least one supporting member of the three supporting members is in the second configuration, a footprint of the razor handle is broader than the footprint of the razor handle when all of the three supporting members are in the first configuration, wherein the connection member further includes a stop configured to limit rotational movement of the three supporting members, wherein the stop is cylindrically shaped, and the connection member includes a first lobe, a second lobe, and a third lobe, each of the first lobe, the second lobe, and the third lobe extending outwardly from a central axis of the stop to receive two engagement elements among the engagement elements, wherein the first lobe is separated from the second lobe by a first gap, the second lobe is separated from the third lobe by a second gap, and the third lobe is separated from the first lobe by a third gap, the first gap configured to receive a first supporting member among the three supporting members, the second gap configured to receive a second supporting member among the three supporting members, and the third gap configured to receive a third supporting member among the three supporting members, and wherein each gap among the first gap, the second gap, and the third gap extends along an entire length of the connection member in parallel with the central axis of the connection member.

2. The razor handle of claim 1, wherein the three supporting members are formed as struts, which in the first configuration form a gripping portion of the razor handle.

3. The razor handle of claim 1, wherein the engagement elements are pins.

4. The razor handle of claim 1, wherein the top portion includes a button that is configured to eject the blade assembly.

5. The razor handle of claim 1, wherein the engagement elements of each of the three supporting members and the respective connection member are rotationally connected as a hinge.

6. The razor handle of claim 1, including only three supporting members.

7. The razor handle of claim 1, wherein the first supporting member rotates about a first axis, the second supporting member rotates about a second axis, and the third supporting member rotates about a third axis.

8. The razor handle of claim 1, wherein the engagement elements are protrusions.

9. The razor handle of claim 1, wherein the stop limits the rotational movement of the three supporting members to an angle of less than 60 degrees.

10. The razor handle of claim 9, wherein the stop limits the rotational movement of the three supporting members to an angle in a range of 25 to 50 degrees.

11. The razor handle of claim 1, wherein the footprint of the three supporting members in the second configuration is at least two times larger than the footprint of the three supporting members in the first configuration.

12. The razor handle of claim 1, wherein the proximal end of one or more supporting members of the three supporting members includes a relief.

13. The razor handle of claim 12, wherein the relief corresponds with the top portion to further control the rotational movement of the three supporting members.

14. The razor handle of claim 13, wherein the relief and the top portion are configured to provide a resistance or frictional force with respect to the rotational movement of the three supporting members.

15. A method of configuring a razor handle to be stored in an upright configuration, wherein the method comprises:

providing a razor handle according to claim 1; and moving at least one supporting member of the three supporting members of the razor handle into the second configuration.

16. A razor assembly comprising:

a blade assembly; and the razor handle according to claim 1.

17. A razor handle comprising:

a top portion configured to connect to a blade assembly;

a connection member configured to connect to the top portion; and a bottom portion configured to support the connection member and comprising three supporting members, a respective proximal end of each supporting member of the three supporting members including engagement elements being rotationally connected to the connection member, wherein the connection member further includes a stop provided along a central axis of the connection member, wherein the stop is cylindrically shaped, and the connection member includes a first lobe, a second lobe, and a third lobe, each of the first lobe, the second lobe, and the third lobe extending outwardly from the central axis of the connection member to receive two engagement elements among the engagement elements, wherein the first lobe is separated from the second lobe by a first gap, the second lobe is separated from the third lobe by a second gap, and the third lobe is separated from the first lobe by a third gap, the first gap configured to receive a first supporting member among the three supporting members, the second gap configured to receive a second supporting member among the three supporting members, and the third gap configured to receive a third supporting member among the three supporting members, and wherein each gap among the first gap, the second gap, and the third gap extends along an entire length of the connection member in parallel with the central axis of the connection member.

* * * * *